(12) United States Patent
Scrafford et al.

(10) Patent No.: US 9,329,822 B2
(45) Date of Patent: May 3, 2016

(54) METHODS AND APPARATUS FOR IMPROVED OPERATION OF NETWORKED PRINTING SYSTEM

(75) Inventors: Matthew Scrafford, Fairort, NY (US); Shawn Kammerdiener, Rochester, NY (US); Victor Ciriza, La Tour du Pin (FR); Pascal Valobra, Meylan (FR); Bruno Marquie, St. Martin d'Heres (FR); Kirk Pothos, Webster, NY (US); Guillaume Bouchard, Crolles (FR); Francois Ragnet, Venon (FR)

(73) Assignee: Xerox Corporation, Norwalk, CT (US)

( * ) Notice: Subject to any disclaimer, the term of this patent is extended or adjusted under 35 U.S.C. 154(b) by 1971 days.

(21) Appl. No.: 11/696,402

(22) Filed: Apr. 4, 2007

(65) Prior Publication Data
US 2008/0246986 A1 Oct. 9, 2008

(51) Int. Cl.
*G06F 3/12* (2006.01)
*H04L 12/24* (2006.01)
*H04N 1/00* (2006.01)

(52) U.S. Cl.
CPC ............ *G06F 3/1261* (2013.01); *G06F 3/1213* (2013.01); *G06F 3/1218* (2013.01); *G06F 3/1232* (2013.01); *G06F 3/1285* (2013.01); *H04L 41/12* (2013.01); *H04N 1/00222* (2013.01)

(58) Field of Classification Search
USPC ............... 358/1.1, 1.6, 1.14, 1.15; 706/45, 46
See application file for complete search history.

(56) References Cited

U.S. PATENT DOCUMENTS

| 5,488,715 | A | 1/1996 | Wainwright |
| 6,498,656 | B1 * | 12/2002 | Mastie et al. ................ 358/1.15 |
| 6,732,195 | B1 | 5/2004 | Baldwin |
| 6,782,345 | B1 | 8/2004 | Siegel et al. |
| 6,901,446 | B2 * | 5/2005 | Chellis et al. ................ 709/226 |
| 7,086,001 | B1 | 8/2006 | Hicks et al. |
| 7,086,011 | B2 * | 8/2006 | Budrys et al. ................ 715/837 |
| 7,567,946 | B2 * | 7/2009 | Andreoli et al. .............. 706/46 |
| 7,949,740 | B2 * | 5/2011 | Scrafford et al. ............ 709/223 |
| 2002/0196463 | A1 | 12/2002 | Schlonski et al. |
| 2003/0090697 | A1 | 5/2003 | Lester et al. |
| 2003/0093521 | A1 | 5/2003 | Schlonski et al. |

(Continued)

FOREIGN PATENT DOCUMENTS

| EP | 0 921 465 | 6/1999 |
| JP | 04344967 A | 12/1992 |

(Continued)

OTHER PUBLICATIONS

CUPS Software Administrators Manual, Chapter 4, "Printer Classes", available on the Internet at www.cups.org/PRINTER_CLASSES, CUPS-SAM-1.1.21, Easy Software Products, 2003.

(Continued)

*Primary Examiner* — Nicholas Pachol
(74) *Attorney, Agent, or Firm* — Fay Sharpe LLP (57) ABSTRACT

Methods and systems are presented for performing one or more printer device management functions in a network, in which affinities between printers are determined from job tracking data to indicate associations between printer devices and user devices, and the affinity data is used to perform one or more printer management functions such as determining printer connections for new or roaming user devices, print job redirection, and identification of underutilized printer device assets.

20 Claims, 6 Drawing Sheets

(56) References Cited

U.S. PATENT DOCUMENTS

| | | | |
|---|---|---|---|
| 2003/0110413 A1 | 6/2003 | Bernklau-Halvor | |
| 2003/0142344 A1 | 7/2003 | Geske et al. | |
| 2003/0156683 A1 | 8/2003 | Adachi | |
| 2004/0103337 A1 | 5/2004 | Smith | |
| 2006/0044600 A1 | 3/2006 | Oosawa | |
| 2006/0132826 A1 | 6/2006 | Ciriza et al. | |
| 2006/0149598 A1 | 7/2006 | Adachi | |
| 2006/0197973 A1 | 9/2006 | Castellani et al. | |
| 2006/0206445 A1 | 9/2006 | Andreoli et al. | |
| 2006/0259549 A1 | 11/2006 | Huang | |
| 2008/0246987 A1* | 10/2008 | Scrafford et al. | 358/1.15 |

FOREIGN PATENT DOCUMENTS

| | | |
|---|---|---|
| JP | 10296593 | 11/1998 |
| JP | 2003177945 | 6/2003 |
| JP | 2004234082 | 8/2004 |

OTHER PUBLICATIONS

Microsoft Knowledge Base Article, No. 318749, "How to: Create a Printing Pool in Windows 2000", available on the Internet at www.support.microsoft.com, Sep. 2003.

Product Brochure, "HP Output Server, Reliable Document Delivery Across the Enterprise", available on the Internet at http://www.hp.com/united-states/outputmanagement/products/hpom_output_srve.pdf, Apr. 2004.

Product Brochure, "JetCAPS® ClusterQue, Balanced and Controlled Volume Printing", available on the internet at http://h40041.www4.hp.com/contents/solutions/pdf/ds_clusterque.pdf, Jul. 2004.

European Search Report, EP 08 15 2982, Nov. 25, 2009.

Teresa F. Lunt, R. Jagannathan, Rosanna Lee, Alan Whitehurst, "Knowledge-Based Intrusion Detection".

European Search Report, EP 08 15 2983, Jan. 27, 2010.

\* cited by examiner

METHODS AND APPARATUS FOR IMPROVED OPERATION OF NETWORKED PRINTING SYSTEM

BACKGROUND

The present disclosure is generally related to operation and management of printer output devices such as printers, copiers, facsimile machines and the like in networked printing environments where users submit print jobs to one of a number of printer devices connected to a network. Businesses, universities, government agencies and other large enterprises often network large numbers of personal computers and printers together, allowing users to print to different printer devices based on print job characteristics, printer device capabilities, proximity of a given user to certain printers, and other factors. Distributed computing and printing enterprise architectures provide economic advantages by allowing direction of individual print jobs to the suitable printer with the lowest cost while also maximizing printer device utilization. In addition, networked printer systems can provide redundancy for situations in which one or more printer devices are off-line for servicing or where a given printer is occupied by a very large print job. The costs associated with operating and maintaining large numbers of networked printers, however, can be large, and IT personnel or other staff are commonly tasked with ordering supplies, calling for outside printer maintenance, connecting new users to appropriate printers, setting local printer selection default settings on user computers according to location, printer load balancing, and other considerations.

In many networked printing environments, the various printer management functions are conventionally performed in an ad hoc manner, often using incomplete or unavailable printer utilization data, leading to inefficiencies and added costs for operating print output devices in a networked enterprise. One such management task is optimizing asset usage to maximize the utilization of multi-function printer devices while minimizing the average distance from users to printers, along with decommissioning personal printer devices or printers used by only a small number of users. Other printer management functions include redirection of print jobs to suitable alternative printers when the default or selected printer device is busy or unavailable. Also, new or roaming users must be operatively connected to appropriate printer devices through configuration of print drivers and default printer selections as user equipment is added or moved within the enterprise. As the output printer needs of users expand and as the size networked computing environments increases, there is a need for improved printer device management systems and techniques to ensure continued or improved printer utilization and cost efficiency.

BRIEF DESCRIPTION

Methods and systems are provided for advanced printer device management in a networked system by which various management tasks can be performed in an automated manner according to actual network conditions and printer device usage, in which affinities between users and printers are determined from job tracking data to indicate associations between printer devices and user devices. The affinity data is employed in performance of one or more printer management functions such as determining printer connections for new or roaming user devices, print job redirection, and identification of underutilized printer device assets.

In accordance with one or more aspects of the present disclosure, a method is provided for managing printer devices connected to a network. The method comprises gathering job tracking data for print jobs in the network, determining affinity data indicating associations between printer devices and user devices based on the job tracking data, and performing at least one printer device management action based at least partially on the affinity data. The affinity data may be determined in a variety of ways, such as by tracking job redirections to quantify the propensity for user devices utilizing a first printer to also utilize a second printer. In certain exemplary embodiments, the printer device management action comprises assessing printer device utilization according to the affinity data, along with redirection of users of low affinity printer devices to higher affinity printer devices and removal of the low affinity printers from the network. In other implementations, the printer device management action involves identifying one or more alternate printer devices for a print job directed to an unavailable printer based at least partially on the affinity data and selectively redirecting the print job to an alternate printer device. The user may optionally be prompted with a choice of the alternate printers for the print job, with the job being selectively redirected to the alternate device selected by the user. In other embodiments, the printer device management action comprises identifying at least one suitable printer device for providing printing services to a new or roaming user device base at least partially on the affinity data. In certain implementations, suitable printers are identified based on affinity data for at least one other user device in the network having one or more comparable operating characteristics, such as similar IP address, user credentials, document type, requested media size, operating system, document color, page count, duplexing conditions, and finishing options, etc.

Further aspects of the disclosure provide a networked printing system which includes a plurality of user devices operably coupled with a network and a plurality of printer devices operably coupled with the network. The system also includes a printer device manager component that determines affinity data indicating associations between printer devices and user devices based on job tracking data, and which performs at least one printer device management action based at least partially on the affinity data. In one embodiment, the device manager component is a software program running on a network server or other form of network component that assesses printer device utilization and selectively redirects users of low affinity printer devices to higher affinity printer devices based at least partially on the affinity data. In other embodiments, the device manager component performs intelligent job redirection tasks by identifying one or more alternate printer devices for a print job directed to an unavailable printer device based at least partially on the affinity data and selectively redirects the print job to an alternate printer device. In still further embodiments, the device manager component identifies one or more suitable printer devices for providing printing services to a new or roaming user device base at least partially on the affinity data, such as by using printer affinity data associated with at least one other user device having comparable operating characteristics.

Still other aspects of the disclosure are related to a printer device manager system for managing printer devices connected to a network. The system comprises an affinity data component operative to gather job tracking data for print jobs in the network and to determine affinity data indicating associations between printer devices and user devices based on the job tracking data, and a printer device management component operative to perform a printer device management action based at least partially on the affinity data. The manager component in one implementation assesses printer device utilization based at least partially on the affinity data. In other embodiments, the printer device manager component identifies alternate printers for a print job directed to an unavailable printer device based at least partially on the affinity data and selectively redirects the print job to an alternate printer, and may also identify one or more suitable printer devices for supporting printing services to a new or roaming user device base at least partially on the affinity data.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
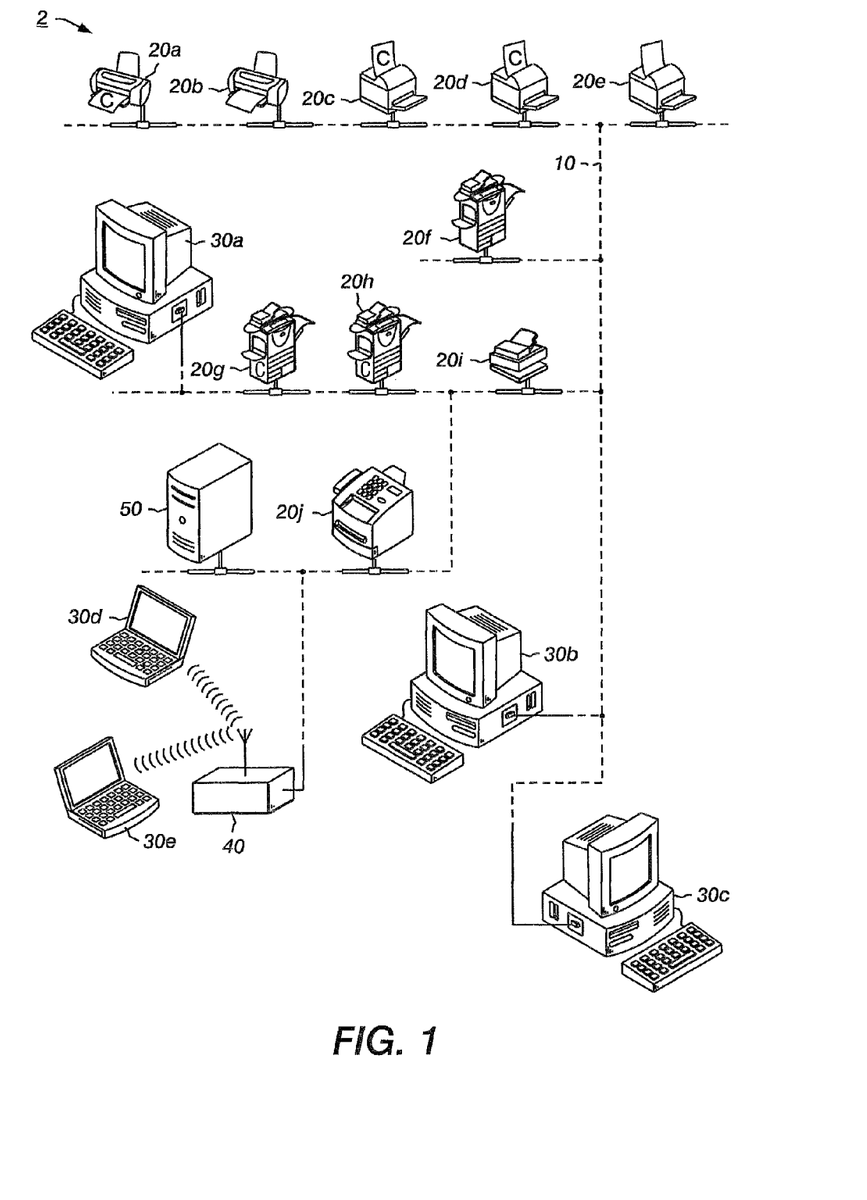
FIG. 1 is a system diagram illustrating an exemplary distributed computing environment with a plurality of user computers and printer output devices operatively coupled to a network along with a network print server.

Referring now to the drawings, FIG. 1 illustrates an exemplary distributed computing environment or system 2 in which one or more aspects of the present disclosure may be carried out. The system 2 includes a network 10 with which a plurality of printer output devices 20 and user computers 30 are operatively coupled. In addition, one or more print servers 50 are coupled with the network 10, where certain portions of the network 10 may be interconnected by cabling or one or more portions may be wireless, and where one or more exemplary computers 30d and 30e are illustrated in FIG. 1 with operative communicative coupling to the network 10 being implemented using a wireless network transceiver interface component 40. Any number of user devices may be operatively coupled to the network 10, including without limitation desktop computers 30a-30b, laptop computers 30d, 30e, and any number of printer output devices 20 may be coupled with the network 10. Different forms of printer devices are networked together in this example to provide the user devices 30 with a broad range of printing options available for a given print job. In the exemplary system 2 illustrated in FIG. 1, the available printer output devices 20 include relatively low throughput externally fed color as well as black and white desktop printers 20a and 20b, respectively, intermediate speed drawer fed color and black and white printers 20c-20e, high volume color as well as black and white printer/scanner/copier devices 20f-20h, a desktop combination printer/scanner/copier 20i and a combination printer and facsimile machine 20j. The network 10, moreover, can be arranged in any suitable configuration for example star, ring, bus, tree, mesh, etc. or combinations thereof, and may be a wired network, a wireless network, or combinations thereof, wherein the illustrated example provides one or more wireless nodes 40 for connectivity for portable laptop computers 30d and 30e through various WiFi or other wireless means. The system 2 thus constitutes an embodiment of a networked printing system with a plurality of user devices 30 operably coupled with the network 10 and a plurality of printer devices 20 and the server 50 also operably coupled with the network 10.

Figure 2:
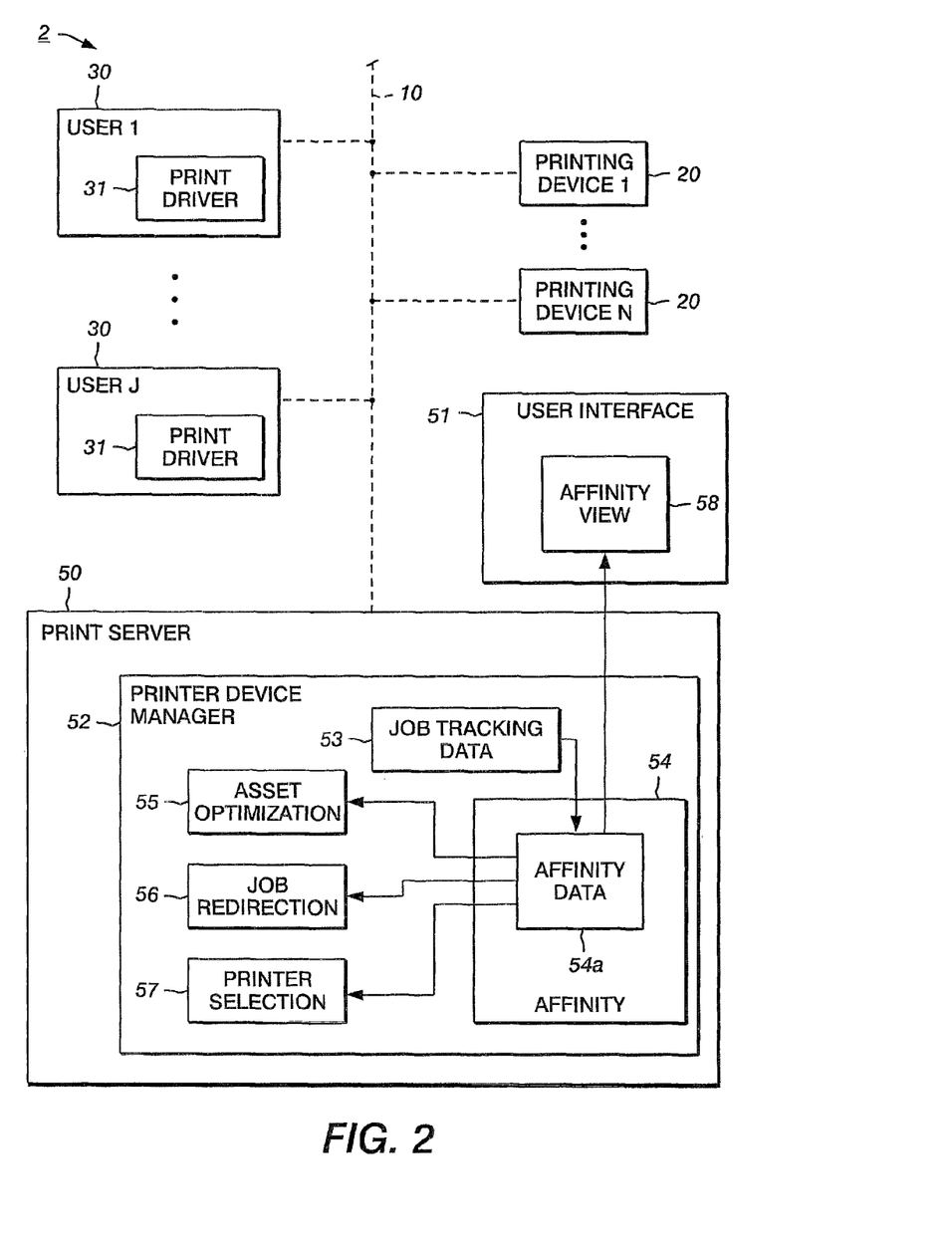
FIG. 2 is a schematic diagram illustrating further details of the print server in the networked system of FIG. 1, including a printer device manager program with an affinity data component that determines printer and user affinity values according to job tracking data, as well as one or more printer device management components for performing asset optimization, job redirection, and printer selection tasks according to the affinity data.

Referring also to FIG. 2, the system 2 further includes a printer device manager component 52 operatively coupled with the network 10. In one embodiment, the manager component 52 can be a software application running on the network server 50. Other embodiments are possible, for example, wherein the printer device manager 52 is implemented in any suitable hardware, software, logic, firmware, or combinations thereof, whether unitary or implemented in distributed fashion in a number of networked host devices, by which the device manager 52 is operatively communicatively coupled with other devices (e.g., printers 20, user-devices 30, etc.) via the network 10. In this regard, the printer device manager may be an application running on any computing host capable of communicating with the printers 20 and users 30 of the system, whether directly coupled to the network 10 or coupled therewith through one or more intervening networks. As further shown in FIG. 2, the user devices 30 may include one or more print drivers 31, such as driver software running on the user devices 30, which may interact with the printer device manager component 52 in supporting various printing services and printer device management actions in the networked system 2.

In accordance with the present disclosure, the printer device manager 52 receives job tracking data 53 associated with print jobs submitted by user devices 30 to printer output devices 20 in the network 10, and the device manager 52 includes an affinity component 54 that gathers the job tracking data 53 and determines affinity data 54a indicating associations between printer devices 20 and user devices 30 based on the job tracking data 53. The exemplary device manager 52 also includes one or more printer device management components 55-57 that perform at least one printer device management action based at least partially on the affinity data 54a. In the embodiment of FIGS. 1 and 2, the device manager 52 includes an asset optimization component 55 for detecting utilization of the printer output devices 20, as well as a job redirection component 56 and a printer selection component 57, each of which perform various managerial actions based in whole or in part of the affinity data 54a for managing the printer assets 20 coupled with the network 10 in the system 2. In the embodiment of FIGS. 1 and 2, moreover, the server 50 is operatively coupled with a user interface 51 for receiving operator inputs and for displaying or rendering information to an operator. In this regard, the affinity component 54 of the device manager 52 provides an affinity view or rendering 58 to the user interface 51, as illustrated and described further below with respect to FIG. 4.

The present disclosure contemplates determination or generation of affinity data 54a indicating associations between the printer devices 20 and user devices 30 based on the job tracking data 53, and the performance of at least one printer device management action based at least partially on the affinity data 54a. The affinity data 54a can be any form of numeric and/or graphical representation, such as affinity values that are derived from the job tracking data 53. In this respect, the job tracking data 53 indicates or includes various parameters associated with a submitted print job, including the identity of the submitting user device 30, the time and date of job submission, a target printer device 20 to which the job was initially submitted, and the identity of any secondary or alternate printer device 20 to which the job may have been redirected. In addition, the job tracking data 53 may include information regarding the specific printing requirements of the job, including without limitation document type, requested media size, document color, page count, duplexing conditions, and finishing options such as stapling, binding, collating, etc. From the job tracking data 53 concerning user print requests to print output devices 20, the affinity component 54 of the printer device manager 52 determines the affinity data 54a using any suitable mathematical analysis, data sorting, or other algorithms or computational techniques to correlate patterns of user printing behavior to derive affinities that exist between devices 20 themselves and between users 30 and printer devices 20, as well as affinities between the user devices 30 themselves.

The affinity data or value associated with or between printer output devices 20 is a measure of their common use by a user or set of users. For instance, if a first user device 30 sends print jobs to only two printers 20, there is an affinity between those two printer devices 20. If a second user 30 also prints only to those two printers 20, the affinity between these printers is increased. Similarly, the common usage of one or more printers 20 by two given users 30 indicates an affinity between the users 30 based on their corresponding print job tracking data 53. In this regard, the inventors have appreciated that because the job tracking data is dynamic and is updated by further print job submissions, the job submission, job redirection, and the derived affinity data 54a will tend to adapt to changes in the print environment in the system 2. Accordingly, one or more events or conditions may be inferred or detected based on the affinity data 54a, such as a printer 20 going off-line or moving to a different location within the networked system 2 (e.g. change of floor/building scenario) or a user 30 moving to a different location (e.g., change of office scenario).

Figure 3:
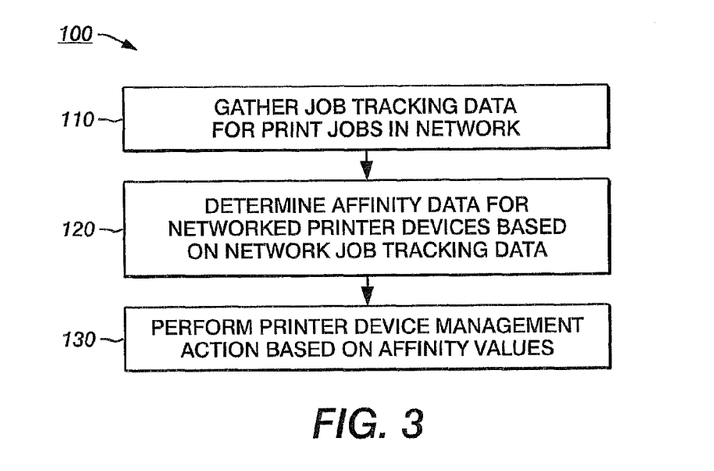
FIG. 3 is an exemplary flow diagram illustrating an exemplary method for performing affinity-based printer device management actions in a networked printer environment in accordance with the present disclosure.

FIG. 3 provides a flow diagram illustrating an exemplary method 100 for performing printer device management actions in a networked printer environment in accordance with the present disclosure, which is implemented in the exemplary printer device manager component 52 in the embodiments of FIGS. 1 and 2. While the method 100 and other methods of the disclosure are illustrated and described in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated method 100 and other methods of the disclosure may be implemented in hardware, software, or combinations thereof, whether in a single device management component or system or in distributed form in two or more components or systems, and may be employed in association with any form of printing devices including without limitation desktop printers, network printers, copiers, scanners, facsimile machines, multi-function printer/copier/facsimile devices, high-speed printing/publishing systems and digital printing presses, etc., wherein the disclosure is not limited to the specific devices, systems, applications, and implementations illustrated and described herein.

The method 100 begins at 110 in FIG. 3 with the job tracking data 53 being gathered for print jobs in the network 2. In one embodiment, the tracking data 53 is gathered by the device manager application 52 in the server 50 for use in one or more print management functions, including the exemplary automatic or semiautomatic operations described herein, wherein the device manager 50 in the illustrated implementations provides the tracking data 53 to the affinity component 54 and may also store or archive the job tracking data 53 in the server or elsewhere in the system 2 for later retrieval. At 120, the affinity data 54a is determined for the networked printer devices 20 and users 30 based on the job tracking data 53. As described above, any suitable computational techniques or algorithms can be employed in deriving the affinity data 54a from the job tracking data 53 in accordance with the present disclosure. At 130 in FIG. 3, one or more printer device management functions or actions are performed based at least in part on the affinity data 54a.

Figure 4:
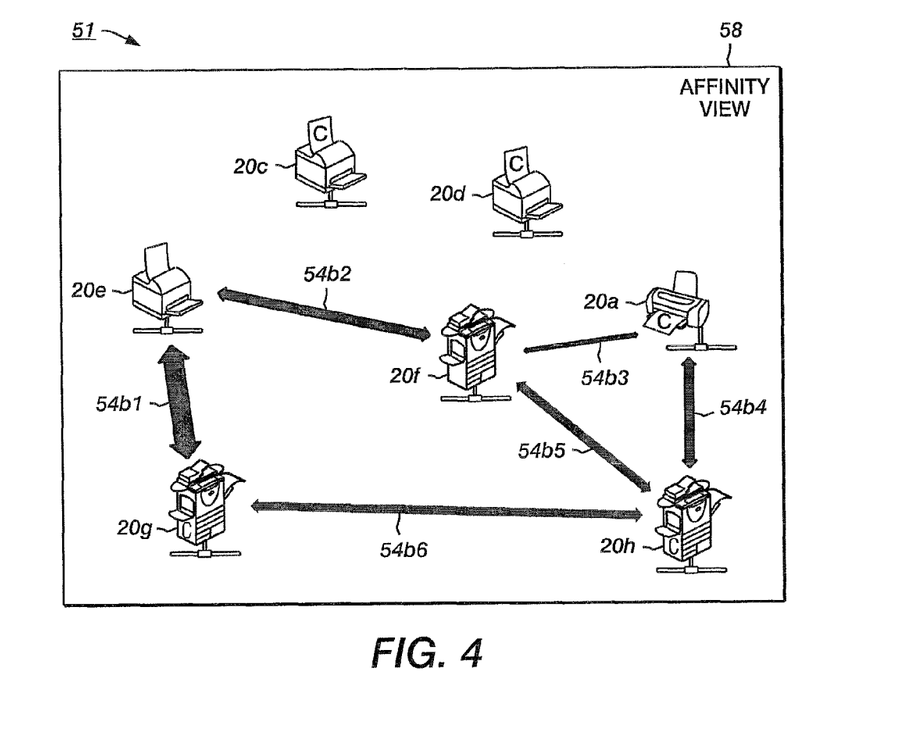
FIG. 4 is a schematic diagram illustrating an exemplary affinity view user interface rendering in the device manager of FIGS. 1 and 2.

Referring also to FIG. 4, an exemplary affinity view 58 is illustrated as rendered to an operator via the user interface 51 associated with the server 50 in the system 2. In this simplified depiction of FIG. 4, only a few exemplary printer devices 20 are shown so as not to obscure the various aspects of the present disclosure, wherein it will be appreciated that affinity views of large networked systems may include graphical indicia or icons representing any number of networked printers 20 and the affinities therebetween. In the example of FIG. 4, the affinities between any two printers 20 are represented as arrows 54b, wherein the thickness of the arrow 54b indicates the value of the affinity with thicker arrows 54b indicating stronger affinities and vice versa. In this embodiment, moreover, the affinity view 58 may automatically group icons of strongly affine printers 20 together with devices 20 having weak affinities spaced from the strongly affine groups, in order to allow an operator to easily see the affinity relationships of the various printer devices 20 in a given system 2. Alternatively or in combination, the affinity view 58 may allow an operator to drag the printer device icons 20 as desired to more easily ascertain affinities of a given printer 20 or printer group. In the example of FIG. 4, several of the printer devices 20a, 20c, 20d, 20e, 20f, 20g, and 20h are shown from the system 2 of FIGS. 1 and 2, wherein certain devices 20 and users 30 are omitted from the depiction of FIG. 4 for clarity.

As shown in FIG. 4, a strong affinity 54b1 exists between printers 20e and 20g, thereby indicating that users of printer 20e are very likely to also utilize printer 20g and vice versa. Somewhat weaker affinities exist in this example between printers 20e and 20f (affinity 54b2), printers 20a and 20h (affinity 54b4), printers 20f and 20h (affinity 54b5), and between printers 20g and 20h (affinity 54b6). In addition, a fairly weak affinity 54b3 is shown in the affinity view 58 between printers 20a and 20f. Moreover, two printers 20c and 20d are illustrated with little or no affinity to each other or to any other illustrated printer 20. As can be seen in the example of FIG. 4, two printers 20f and 20h have affinities to at least three other printers, while the printers 20c and 20d have substantially no affinities. In accordance with the present disclosure, this affinity information, as graphically rendered in the affinity view 58 of FIG. 4 can be advantageously employed in automated or semiautomatic performance of print management tasks by the print manager component 52, or by the printer management components 55-57 thereof, and/or by the print drivers 31 in the system 2.

Referring to FIGS. 2-5, in one aspect of the disclosure, printer utilization detection and printer asset optimization actions can be undertaken by the asset optimization component 55 using the affinity data 54a. In this regard, the present disclosure contemplates that those printer devices 20, such as printers 20c and 20d in the example of FIG. 4, having little or no determined affinity to other printers 20 are most likely used by a single user 30 or by a small number of users 30. As a result, in order to optimize printer asset utilization in the system 2, such devices 20c and 20d are identified by the component 55 as candidates for removal based at least partially on the affinity data 54a. In this manner, printers that are only used by a single user 30 can be decommissioned, thereby saving asset maintenance costs in the system 2 as a whole. In this aspect of the disclosure, therefore, the affinity data 54a represents the propensity for users 30 utilizing a specific printer 20 to also utilize a related printer 20, and also identifies printer devices 20 that are not widely used in the networked system 2.

Figure 5:
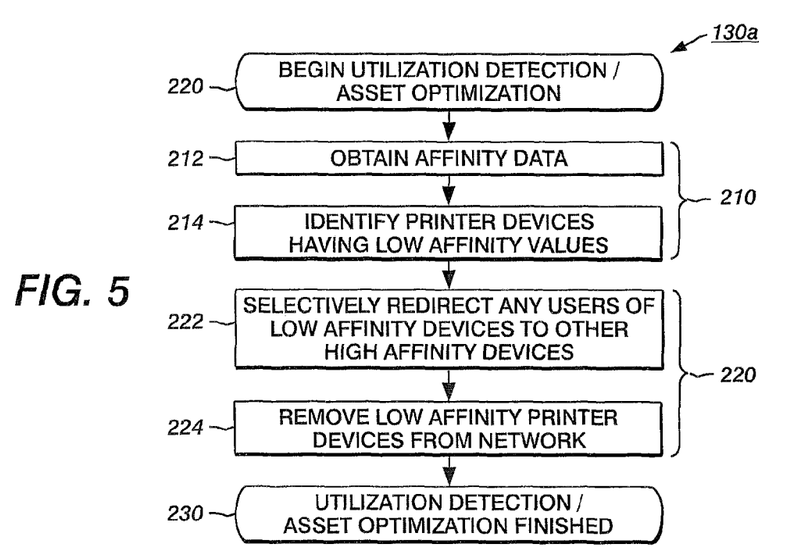
FIG. 5 is a flow diagram illustrating an exemplary implementation of the method of FIG. 3 in which affinity data is used for asset optimization in identifying under utilized printer devices.

FIG. 5 illustrates an exemplary implementation 130a of the method 100 of FIG. 3, wherein the affinity data 54a is used for asset optimization in identifying under utilized printer devices, such as the devices 20c and 20d in FIG. 4. The utilization detection and asset optimization begins at 202 in FIG. 5, wherein printer device utilization is assessed at 210 based at least partially on the affinity data 54a. In this implementation, affinity data 54a is obtained at 212, for instance, with the asset optimization component 55 in FIG. 2 obtaining the affinity data 54a as described above in one embodiment at 212. At 214, printer devices are identified having low (e.g. or zero) affinity values. Thereafter at 220, the asset optimization device 55 or other component of the device manager 52 initiates one or more remedial device management actions so as to address the under utilization of the identified device(s) 20. In the example of FIG. 5, any users 30 associated with the under utilized devices 20 are selectively redirected at 222 to other devices 20 having higher affinity data values. For instance, in the exemplary situation illustrated in FIG. 4, user devices 30 associated with printers 20c and 20d may be redirected (e.g. through the device manager 52 communicating with the print drivers 31 of these devices 30) to instead use another printer 20 in the network 10, such as the high affinity devices 20a, or 20e-20h. The device manager 52 can then effectively decommission the excess assets 20c and 20d at 224, which can then be removed from the network 10, where the utilization detection and asset optimization task is then finished at 230.

Figure 6:
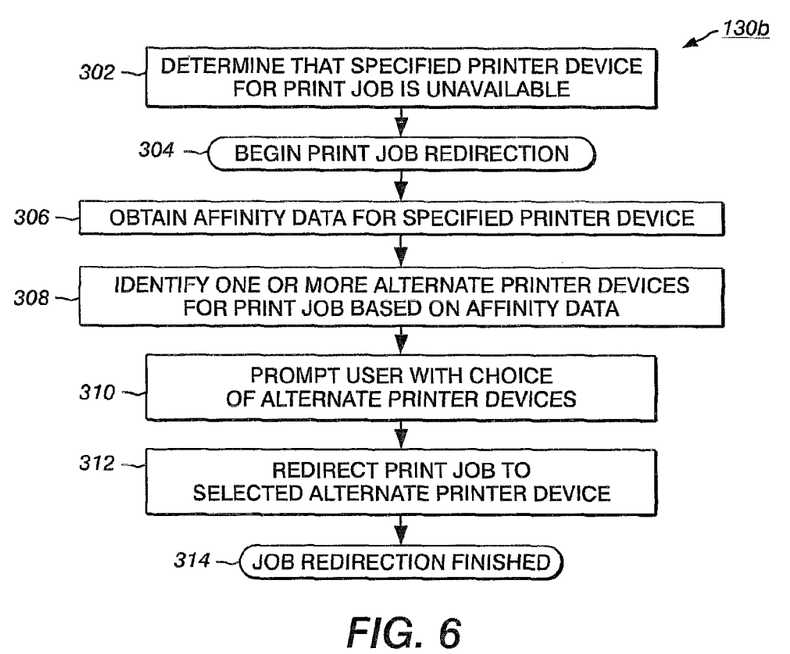
FIG. 6 is a flow diagram illustrating another exemplary implementation of the device management method of FIG. 3 in which print job redirection is performed at least partially according to affinity data.
Figure 7:
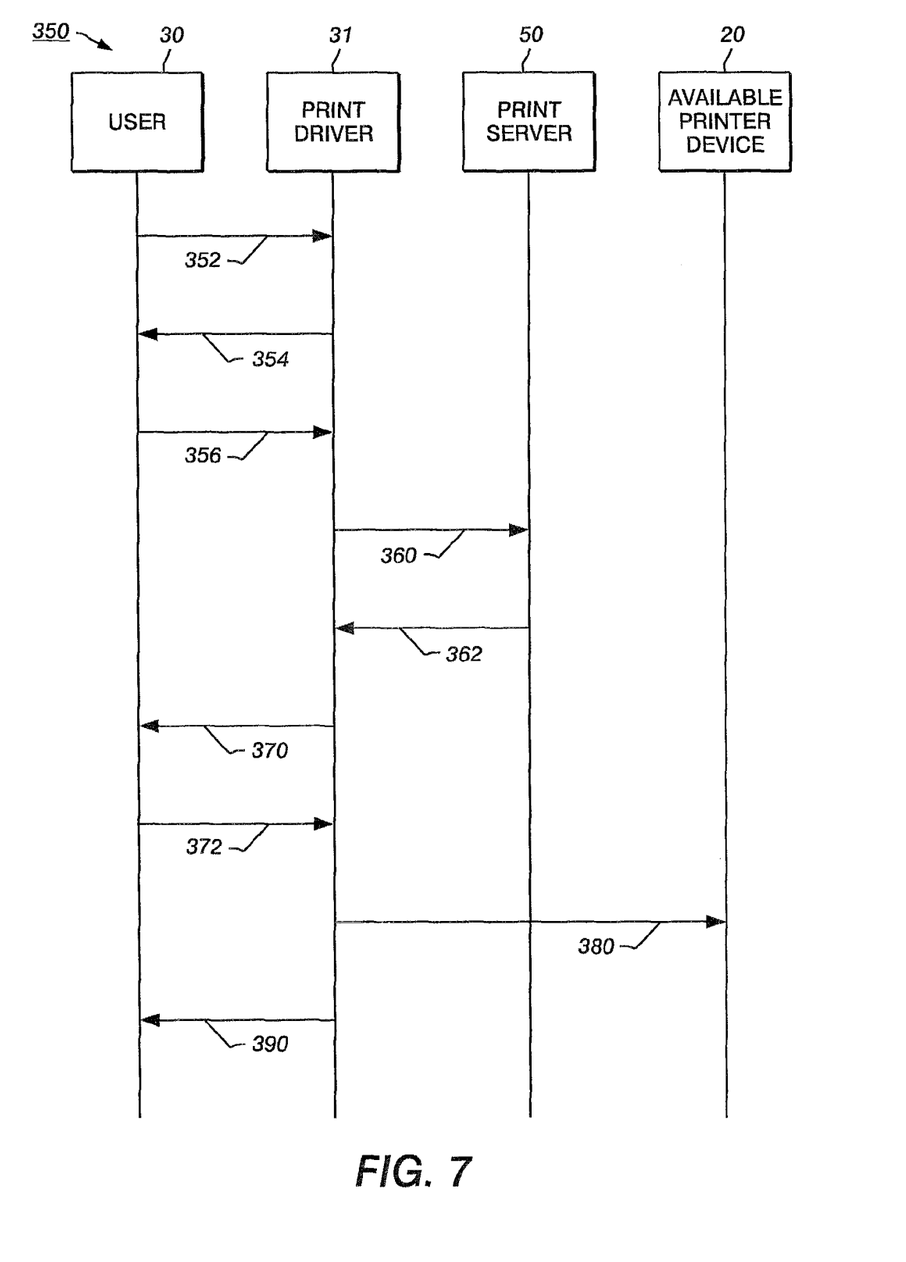
FIG. 7 is a detailed communication flow diagram further illustrating the affinity-based job redirection operation of the system in FIGS. 1 and 2.

Referring now to FIGS. 6 and 7, another aspect of the disclosure provides for intelligent job redirection device management by the device manager 52 using the affinity data 54a. FIG. 6 shows another example 130b of the printer device management action in the method 100 of FIG. 3 above, wherein a determination is made at 302 that a target printer device 20 specified for a given print job has become unavailable. Print job redirection accordingly begins at 304 with affinity data 54a being obtained at 306 for the specified (unavailable) printer device 20, for instance, with the job redirection component 56 obtaining the affinity data 54a in the device manager 52. In alternate implementations, the job redirection component 56 may be implemented in the user device print drivers 31, with the affinity data 54a being obtained from the device manager component 52 as needed to redirect individual print jobs. In this respect the disclosure contemplates that affinity data associated with the unavailable printer 20 will indicate one or more other printers 20 selected for use by users 30 which have also utilized the unavailable printer device 20, and hence, such other printers 20 are likely to be suitable candidates for job redirection. At 308, therefore, one or more alternate printer devices 20 are identified for the print job based at least partially on the affinity data 54a. The alternate printer identification, in this respect, may also be based on parameters associated with the print job, such as whether color is required, number of pages, finishing options, page count, etc. In one embodiment, the job redirection component 56 (e.g., or the driver 31) retrieves affinity data 54a pertaining to the unavailable printer 20 and searches this for non-zero affinities from the unavailable printer 20 to other printers 20 in the network 10, and may then either use these as possible alternatives or may further refine the prospective alternate device list according to specifics of the print job to include only alternate printers 20 capable of servicing the pending job. The user 30 may optionally be prompted at 310 with a choice of alternate printers 20 derived by the job redirection component 56 (e.g., or from the driver 31), and the print job is then redirected at 312 to a software or user-selected alternate device 20 with the automated or semi-automatic print job redirection being finished at 314.

FIG. 7 illustrates one exemplary implementation of affinity-based print job redirection in accordance with the present disclosure, wherein a user device 30 includes one or more software print drivers 31 that represent a class of device that is used for printing, and the driver 31 operates to query the device manager component 52 in the print server 50. In this example, the user 30 (e.g. an application running on the user computer device 30) submits a job to be printed at 352 to the driver 31. The driver 31, in turn, queries the user application 30 for print job parameters at 354, which are provided at 356 to the driver 31. Once it is determined that the initially indicated printer 20 is unavailable, the driver 31 queries the device manager 52 (or the job redirection component 56 thereof) at 360 for a list of suitable alternate printers. The device manager 52 responds at 362 after consulting the applicable affinity data 54a and possibly the print job data with a list of one or more candidate printers 20 to which the job may be redirected. In alternative implementations, the driver 31 can query the device manager 52 for the affinity data 54a and determine the list of possible alternates itself. The driver 31 may then optionally present the printer list to the user 30 at 370, to which the user 30 responds with a selection at 372. The print job is then sent to the selected available printer 20 at 380 and the user 30 is notified at 390 with the print status. In this manner, the exemplary job redirection techniques and systems of the present disclosure operate to automatically or semi-automatically identify a device 20 that can fulfill a particular job request according to affinity to other devices 20 that indicates it can perform similar functions to the unavailable printer 20 and has been used by the same users 30 and also according to it's capabilities.

In other situations, infrastructure managers can use the graphic illustration 58 of the print device affinities and the nature of the available devices 20 shown by the respective icons (FIG. 4) to manually determine the possible alternative print devices 20 that can provide a suitable replacement for a target device 20 that has become unavailable. In this regard, the graphic illustration 58 suggests that the devices 20 related by affinity have been employed by other users 30, and are most likely capable of servicing print jobs from the source device 30.

Figure 8:
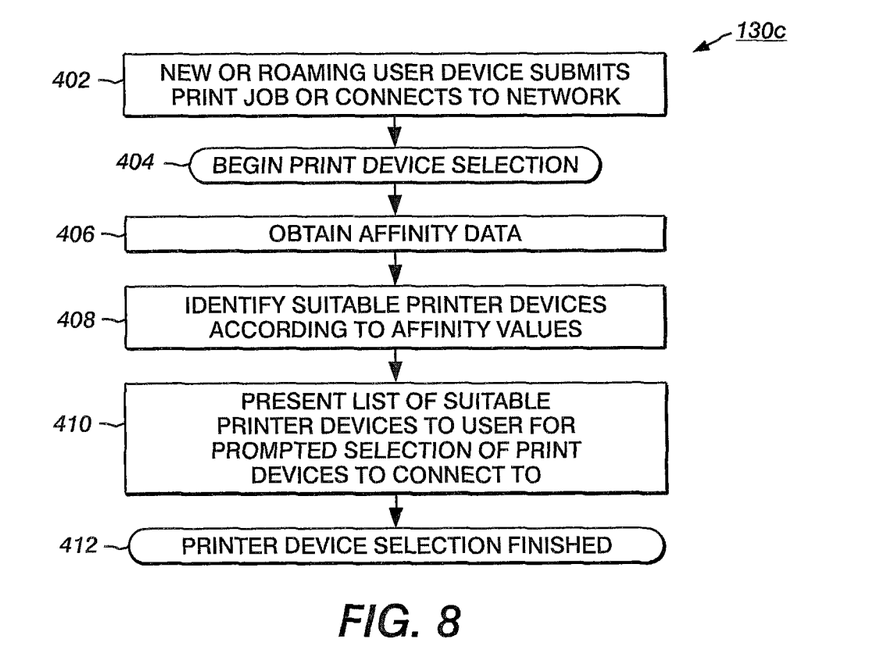
FIG. 8 is a flow diagram illustrating another exemplary implementation of the device management method of FIG. 3 with affinity data being used in identifying one or more suitable printer devices for use by new or roaming users in the network of FIGS. 1 and 2.

Referring now to FIGS. 1, 2, and 8, the present disclosure further contemplates affinity-based printer device selection that can be used in a variety of situations, such as when a new user 30 is connected to the network 10 or where a mobile user device 30 (e.g. wireless laptop computers 30d or 30e in FIG. 1) roams within the networked system 2. In this aspect of the disclosure, the print device manager 52 includes a printer selection component 57 that obtains affinity data 54a as described above, and operates to identify at least one suitable printer device 20 for supporting printing services to a new or roaming user device 30 base at least partially on the affinity data 54a. Other embodiments are possible in which the job redirection component 56 may be implemented in the user device print drivers 31, where the new or roaming driver 31 obtains the affinity data 54a from the device manager component 52 as needed for intelligent printer selection when a user device 30 is added or roams within the network 10. In one possible implementation, the suitable printer 20 is identified based on affinity data 54a for at least one other user device 30 in the network 10 having one or more comparable operating characteristics, such as similar IP address, user credentials, document type, requested media size, operating system, document color, page count, duplexing conditions, and/or finishing options for a submitted print job.

FIG. 8 illustrates another implementation 130c of the affinity-based printer device management action 130 in the method 100 of FIG. 3 above, in which a new or roaming user device 30 connects to the network 10 and/or submits a print job at 402 in FIG. 8. Affinity-based printer selection begins at 404 with the affinity data 54a being obtained at 406, for example, by the printer selection component 57 in the device manager 52 of FIG. 2. At 408 in FIG. 8, the printer selection component 57 identifies suitable printer devices 20 at least in part according to the affinity data values 54a. In one situation where the user device 30 is initially connected to the network 10, the printer identification at 408 could be based solely on the affinity data 54a for users 30 having similar IP addresses, credentials, etc. In another situation where the user 30 has submitted a print job, the printer selection at 408 could also take into account job-based factors such as document type, requested media size, operating system, document color, page count, duplexing conditions, and/or finishing options for a submitted print job. The selection component 57 can either set the default printer selection for the new user 30, or a list of suitable printers 20 can optionally be presented to the user at 410 to prompt the user 30 for a default printer selection to which connection should be made, thereby completing the printer device selection at 412 without the need for manual printer selection based on incomplete knowledge of the available printers, their capabilities, their locations, etc.

In this aspect of the disclosure, new, visiting, or roaming printer infrastructure users 30 who typically have no knowledge of locally available printers 20 and their locations can easily connect to printers that are likely to have the desired capabilities and are likely to be close by advantageously employing the affinity associations determined by previous network printing activities. This provides significant advantages in large networked systems over conventional printer device selection techniques in which the user 30 is presented with a large listing of all available printers with no useful information with which to sort through all the possible selections. The affinity-based techniques of the present disclosure instead provide the user 30 with a concise list of suggested print devices 20 to use based on which devices 20 other users on the subnet utilize. Thus, the present disclosure facilitates use of affinity information and collected information about network topology to assist a user 30 in choosing the best print output devices 20 that are available in the current location.

The above described examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A method for managing printer devices connected to a network, the method comprising:
    gathering job tracking data for print jobs in the network, the job tracking data including the identity of the submitting, user device and the identity a target printer device to which the job was initially submitted;
    determining affinity data based on the job tracking data the affinity data indicating associations between printer devices based on user preferences for printer devices selected for submitted print jobs; and
    performing at least one printer device management action based at least partially on the affinity data.

2. The method of claim 1, wherein performing at least one printer device management action comprises assessing printer device utilization based at least partially on the affinity data.

3. The method of claim 2, further comprising selectively redirecting users of low affinity printer devices to higher affinity printer devices based at least partially on the affinity data and removing low affinity printer devices from the network.

4. The method of claim 1, wherein performing at least one printer device management action comprises identifying at least one alternate printer device for a print job directed to an unavailable printer device based at least partially on the affinity data and selectively redirecting the print job to an alternate printer device.

5. The method of claim 4, further comprising prompting a user with a choice of the at least one alternate printer device for the print job, and redirecting the print job to a selected alternate printer device.

6. method of claim 1, wherein performing at least one printer device management action comprises identifying at least one suitable printer device for supporting printing services to a new or roaming user device base at least partially on the affinity data.

7. The method of claim 6, wherein the at least one suitable printer device is identified based on affinity data for at least one other user device in the network having one or more comparable operating characteristics.

8. The method of claim 7, wherein the one or more comparable operating characteristics include at least one of similar IP address, user credentials, document type, requested media size, operating system, document color, page count, duplexing conditions, and finishing options.

9. The method of claim 1, wherein determining affinity data indicating associations between printer devices and user devices based on the job tracking data includes tracking job redirections to quantify the propensity for user devices utilizing a first printer to also utilize a second printer.

10. A networked printing system comprising:
a plurality of user devices operably coupled with a network;
a plurality of printer devices operably coupled with the network; and
a printer device manager component operatively coupled with the network, the printer device manager component operative to determine affinity data based on job tracking data, the job tracking data including the identity of a submitting user device and the identity of a target printer device to which a print job was initially submitted, the affinity data indicating associations between printer devices based on user preferences for printer devices selected for submitted print jobs, the printer device manager component further operative to perform at least one printer device management action based at least partially on the affinity data.

11. The system of claim 10, wherein the printer device manager component assesses printer device utilization based at least partially on the affinity data.

12. The system of claim 11, wherein the printer device manager component selectively redirects users of low affinity printer devices to higher affinity printer devices based at least partially on the affinity data.

13. The system of claim 10, wherein the printer device manager component identifies at least one alternate printer device for a print job directed to an unavailable printer device based at least partially on the affinity data and selectively redirects the print job to an alternate printer device.

14. The system of claim 13, wherein the printer device manager component prompts a user with a choice of the at least one alternate printer device for the print job and redirects the print job to a selected alternate printer device.

15. The system of claim 10, wherein the printer device manager component identifies at least one suitable printer device for supporting printing services to a new or roaming user device base at least partially on the affinity data.

16. The system of claim 15, wherein the printer device manager component identifies the at least one suitable printer device based on affinity data for at least one other user device in the network having one or more comparable operating characteristics.

17. A printer device manager system for managing printer devices connected to a network, comprising:
a server with a processor, the server being coupled to a network and including:
an affinity component operative to gather job tracking data for print jobs in the network, the job tracking data including the identity of the submitting user device and the identity of a target printer device to which the job was initially submitted, the affinity component further operative to determine affinity data based on the job tracking data, the affinity data indicating associations between printer devices based on user preferences for rioter devices selected for submitted print job; and
at least one printer device management component operative to perform printer device management action based at least partially on the affinity data.

18. The printer device manager system of claim 17, wherein the printer device manager component assesses printer device utilization based at least partially on the affinity data.

19. The printer device manager system of claim 17. wherein the printer device manager component identifies at least one alternate printer device for a print job directed to an unavailable printer device based at least partially on the affinity data and selectively redirects the print job to an alternate printer device.

20. The printer device manager system of claim 17, wherein the printer device manager component identities at least one suitable printer device for supporting printing services to a new or roaming user device base at least partially on the affinity data.

* * * * *